United States Patent [19]

Clarke-Sturman et al.

[11] Patent Number: 4,900,457

[45] Date of Patent: Feb. 13, 1990

[54] AQUEOUS POLYSACCHARIDE COMPOSITIONS

[75] Inventors: Anthony J. Clarke-Sturman, Faversham; Phillip L. Sturla, Gillingham, both of England

[73] Assignee: Shell Oil Company, Houston, Tex.

[21] Appl. No.: 94,249

[22] Filed: Sep. 4, 1987

[30] Foreign Application Priority Data

Sep. 12, 1986 [GB] United Kingdom ............... 8622032

[51] Int. Cl.[4] ............................................. C09K 7/02
[52] U.S. Cl. ............................ 252/8.514; 252/8.551; 252/8.51; 252/8.513; 536/88; 536/114
[58] Field of Search ............... 252/8.551, 8.51, 8.514, 252/8.513; 536/88, 114

[56] References Cited

U.S. PATENT DOCUMENTS

| | | | |
|---|---|---|---|
| 4,299,825 | 11/1981 | Lee | 424/180 |
| 4,427,556 | 1/1984 | House et al. | 252/8.551 X |
| 4,486,340 | 12/1984 | Glass | 252/8.51 X |
| 4,536,297 | 8/1985 | Loftin et al. | 252/8.51 |
| 4,566,977 | 1/1986 | Hatfield | 252/8.551 X |
| 4,599,180 | 7/1986 | Vio et al. | 536/114 |
| 4,607,099 | 8/1986 | Kanda et al. | 536/114 |
| 4,614,601 | 12/1986 | Sekimoto et al. | 252/8.551 |
| 4,634,667 | 1/1987 | Linton et al. | 435/101 |
| 4,661,266 | 4/1987 | Kanda et al. | 252/8.551 |

FOREIGN PATENT DOCUMENTS

| | | |
|---|---|---|
| 40445 | 11/1981 | European Pat. Off. . |
| 130647 | 1/1985 | European Pat. Off. . |
| 1549734 | 8/1979 | United Kingdom . |

*Primary Examiner*—John F. Terapane
*Assistant Examiner*—Gary L. Geist

[57] ABSTRACT

The invention provides aqueous polysaccharide compositions comprising 0.03 to 5% w/v of a water-soluble polysaccharide, 5 to 80% w/v of at least one salt of at least one mono- or divalent cation, wherein at least 0.05% w/v, based on the composition, of the at least one salt is formate, the balance of the at least one salt, if any, being at least one halide, a process for preparing the compositions, and their use in well-drilling operations.

11 Claims, No Drawings

AQUEOUS POLYSACCHARIDE COMPOSITIONS

This invention relates to aqueous polysaccharide compositions, their preparation and their use in well-drilling operations.

It is known to use aqueous polysaccharide compositions in well-drilling operations, e.g. in oil and gas wells. Examples of polysaccharides include cellulose derivatives, such as carboxyethylcellulose, carboxymethylcellulose, carbosymethylhydroxyethylcellulose, alkylhydroxyalkylcelluloses, alkylcelluloses, alkylcarboxyalkylcelluloses and hydroxyalkylcelluloses (particularly hydroxyethylcellulose); and microbial polysaccharides such as Succinoglycan polysaccharides, Scleroglucan polysaccharides and Xanthan polysaccharides.

Succinoglycan polysaccharides comprise glucose, and, for each 7 mols of glucose, 0.9 to 1.2 mols of galactose, 0.65 to 1.1 mols pyruvate, 0 to 2 mols succinate and 0 to 2 mols of acetate, and are produced by cultivating a slime-forming species of Pseudomonas, Rhizobium, Alcaligenes or Agrobacterium, e.g. Pseudomonas sp. NCIB 11264, Pseudomonas sp. NCIB 11592 or *Agrobacterium radiobacter* NCIB 11883, or mutants thereof, as described, for example, in EP-A No. 40445 (Applicants ref K 1480) or EP-A No. 138255 (Applicants ref. K 1924).

Scleroglucan polysaccharides comprise linear chains of $\beta$-D-(1→3)—linked glucose residues with single glucose side chains in $\beta$-D-(1→6) linkages, and are produced by fungii of the genus sclerotium.

Xanthan polysaccharides typically contain mannose, glucose, glucuronic acid, O-acetyl radicals and acetal-linked pyruvic acid in molar ratio 2:2:1:1:0.5, and are produced by cultivating a species of Xanthomonas bacteria, preferably Xanthomonas campestris e.g. NRRL B-1459, as described, for example, in U.S. Pat. No. 4,299,825, or *Xanthomonas campestris* NCIB 11854, as described in EP-A No. 130647 (Applicants ref. K 1882).

In order to achieve suitable density for use in well-drilling operations, it is conventional for the known aqueous polysaccharide compositions to include water soluble salts, e.g. as described in UK Patent No. 1,549,734. These salts are typically halide salts (e.g. chlorides and bromides) of mono- or divalent cations, such as sodium, potassium, calcium and zinc, e.g. sodium chloride, potassium chloride, calcium bromide or zinc bromide.

One problem faced in drilling operations relates to thermal stability of completion fluids, work-over fluids and drilling fluids. Temperatures in subsurface formations generally rise approximately 1° C. per hundred feet (30 meters) depth. Any aqueous polysaccharide composition has its own characteristic temperature above which it undergoes severe chemical degradation with undesirable reduction of viscosity, thus imposing limitations upon its use in drilling operations below a corresponding depth.

Additives, for example blends of polymeric alkaline materials such as that sold by International Drilling Fluids (UK) Ltd., under the trade mark "PTS 200", have been used to improve thermal stability of aqueous polysaccharide compositions.

It has now surprisingly been found that the thermal stability of aqueous polysaccharide solutions can be significantly enhanced by incorporation therein of certain formate salts.

According to the present invention therefore there is provided an aqueous polysaccharide composition comprising 0.03 to 5% w/v of a water-soluble polysaccharide, 5 to 120% w/v of at least one salt of at least one mono- or divalent cation, wherein at least 0.05% w/v, based on the composition, of the at least one salt is formate, the balance of the at least one salt, if any, being at least one halide.

The halide is most conveniently selected from chloride and bromide.

It is preferred for the at least one cation to be selected from the group consisting of ammonium barium, cesium, calcium, lead, lithium, magnesium, manganese, potassium, rubidium, silver, sodium, strontium, thallium and zinc. Calcium, potassium, sodium and zinc are very convenient cations.

The water-soluble polysaccharide may be a cellulose derivative, such as hydroxyethyl cellulose, or it may be a microbial polysaccharide, such as a Succinoglycan polysaccharide, a Scleroglucan polysaccharide, or a Xanthan polysaccharide. Particularly good results have been achieved using Xanthan polysaccharides in compositions of the invention.

Preferably the water-soluble polysaccharide is present in an amount from 0.1 to 2% w/v, more preferably 0.25 to 0.75% w/v.

It is preferred for the at least one salt to be present in an amount of at least 9% w/v, and the formate to be present in an amount of at least 2% w/v. Advantageously the formate is present in an amount of at least 10% w/v. If desired substantially all of the at least one salt may be formate.

Those skilled in the art will appreciate that 1% w/v corresponds to a concentration of 10 kg m$^{-3}$ (10 g/l) of composition.

It will be apparent to those skilled in the art that incidental quantitites of other salts, such as sulphates, nitrates and bicarbonates, may also be present in compositions of the invention, and inevitably will be present in compositions where sea water, or other naturally occurring brine, is used in preparing the composition in order to provide at least some of the halide salt (where present).

If desired the composition may also contain an antioxidant, e.g. 2-mercaptobenzothiazole. When 2-mercaptobenzothiazole is used it may conveniently be incorporated in the same proportion, w/v, as the water-soluble polysaccharide.

It is advantageous for the pH of the composition to be greater than 7, preferably at least 9, for reasons of stability and reduced corrosiveness of the composition. The pH may be controlled by addition of suitable reagents, e.g. sodium hydroxide or sodium carbonate. The presence of a magnesium salt, e.g. magnesium chloride, in the composition can enable a suitable buffering effect to be achieved.

The invention also provides a process of preparing an aqueous polysaccharide composition of the invention, which process comprises dissolving the at least 0.05% w/v of the formate salt in an aqueous composition containing the water-soluble polysaccharide, with, when present, the at least one halide. Those skilled in the art will appreciate that the order of incorporation of components in the composition is primarily a matter of convenience.

Further in accordance with the invention there is provided the use of a composition of the invention as a completion fluid, a work-over fluid or drilling fluid in a well-drilling operation.

The invention will be further understood from the following illustrative Examples.

EXAMPLES 1 TO 4

To solutions of "SHELLFLO-XA" (trade mark) biopolymer (Xanthan biopolymer) (2.85 kg m$^{-3}$ active polymer) in synthetic sea water the following were added: 2-mercaptobenzothiazole 2.85 kg m$^{-3}$; magnesium chloride 0.5 kg m$^{-3}$; sodium hydroxide to pH 10.0 (25° C.) (i.e. until a precipitate of Mg(OH)$_2$ begins to appear). Sodium formate was added to five samples of this solution in the following amounts: 0, 14,3, 28.5, 57.1 and 142.7 kg m$^{-3}$ final solution.

Synthetic sea water was water containing the following components:

|  | Kg m$^{-3}$ |
|---|---|
| Sodium chloride | 24.5 |
| Magnesium chloride | 5.2 |
| Sodium sulphate | 4.09 |
| Calcium chloride | 1.16 |
| Potassium chloride | 0.695 |
| Sodium bicarbonate | 0.201 |
| Potassium bromide | 0.101 |
| Boric acid | 0.027 |
| Strontium chloride | 0.025 |
| Sodium fluoride | 0.003 |
| Barium nitrate | 99.4 milligrams m$^{-3}$ |
| Manganese nitrate | 34 milligrams m$^{-3}$ |
| Lead nitrate | 66 milligrams m$^{-3}$ |
| Silver nitrate | 0.49 milligrams m$^{-3}$ |

Each of the five solutions was sealed in a glass bottle and the bottles were placed in gas-tight pressure pots. The pots were rolled in an oven at 140° C. for 16 hours. The viscosity of each solution was measured at 30° C. and 10s$^{-1}$ shear rate, using a Haake Viscometer (CV 100) before and after hot rolling to determine the retained viscosity. Results are shown in Table 1.

TABLE 1

| Example Number | Concentration of sodium formate (kg m$^{-3}$) | % of initial viscosity retained |
|---|---|---|
| 1 | 14.3 | 40 |
| 2 | 28.5 | 58 |
| 3 | 57.1 | 70 |
| 4 | 142.7 | 98 |
| Comparative A | 0 | 8.5 |

EXAMPLES 5 TO 8

Solutions in distilled water were prepared comprising the following: "SHELLFLO-XA" (trade mark) biopolymer (2.53 kg m$^{-3}$ active polymer); 2-mercaptobenzothiazole 2.53 kg m$^{-3}$; magnesium chloride 9.5 kg m$^{-3}$; 270 kg m$^{-3}$ of a mixture of sodium chloride and sodium formate; sodium hydroxide to pH 10.0 (25° C.). The ration of sodium formate to sodium chloride was varied to give seven samples ranging 0 to 101 kg m$^{-3}$ sodium formate. Solutions were sealed in glass bottles inside gas-tight pressure pots and hot-rolled in an oven at 150° C. for 16 hours. Viscosities before and after rolling were determined at 30° C. and 10 s$^{-1}$ shear rate as in Examples 1 to 4. Results are shown in Table 2.

TABLE 2

| Example Number | Concentration of sodium formate (kg m$^{-3}$) | % of initial viscosity retained |
|---|---|---|
| 5 | 0.68 | 52 |
| 6 | 6.8 | 60 |
| 7 | 20.4 | 80 |
| 8 | 101.0 | 87 |
| Comparative B | 0 | 17 |

Example 9

"SHELLFLO-XA" (trade mark) biopolymer was used to thicken two drilling fluids of different composition, but with the same density at 20° C. (1230 kg m$^{-3}$). Comparative Fluid C comprised: "SHELLFLO-XA" (7.1 kg m$^{-3}$ active polymer); "PTS 200" (trade mark) stabiliser 11.4 kg m$^{-3}$ ("PTS 200" stabiliser is a blend of polymeric alkaline materials and is sold by International Drilling Fluids (UK) Ltd.); calcium chloride 300 kg m$^{-3}$. Example 9 Fluid comprised: SHELLFLO-XA (7.1 kg m$^{-3}$ active polymer); 2-mercapto-benzothiazole 7.1 kg m$^{-3}$; magnesium chloride 9.5 kg m-3; potassium formate 460 kg m$^{-3}$; sodium hydroxide to pH 10.0 (25° C.). Each fluid was sealed in a glass bottle inside a gas-tight pressure pot and hot rolled in an oven at 153° C. Viscosities were measured at 30° C. and 10 s$^{-1}$ shear rate before and after rolling. Results are shown in table 3.

TABLE 3

| Example Number | Time at 153° C. (hours) | % of initial viscosity retained |
|---|---|---|
| 9 | 16 | 99 |
| 9 | 40 | 83 |
| Comparative C | 16 | 2.4 |

EXAMPLES 10 TO 12

Solutions in distilled water were prepared comprising the following: 2.53 kg m$^{-3}$ of "KELZAN XC" (trade mark) biopolymer, "KELZAN XCD" (trade mark) biopolymer or "SHELLFLO-XA" (trade mark) biopolymer (all Xanthan biopolymers); 2-mercaptobenzothiazole 2.53 kg m$^{-3}$; magnesium chloride 9.5 kg m$^{-3}$; potassium formate 500 kg m$^{-3}$; sodium hydroxide to pH 10.0 (25° C.). The solutions were then sealed in glass bottles inside gas-tight pressure pots and hot-rolled in an oven for 16 hours at either 130° C., 150° C. or 160° C. Viscosities before and after rolling were determined at 30° C. and 10 s$^{-1}$ shear rate as in Examples 1 to 4. Results are shown in Table 4, where Example 10 gives the results for "KELZAN XC" biopolymer; Example 11 gives the results for "KELZAN XCD" biopolymer and Example 12 gives the results for "SHELLFLO-XA" biopolymer.

TABLE 4

| Example Number | % of initial viscosity retained at | | |
|---|---|---|---|
|  | 130° C. | 150° C. | 160° C. |
| 10 | 98 | 90 | 90 |
| 11 | 98 | 60 | 19 |
| 12 | 98 | 96 | 88 |

EXAMPLES 13 AND 14

Solutions were prepared of "SHELLFLO-S" (trade mark) biopolymer (succinoglycan biopolymer) (2.53 kg m$^{-3}$ active polymer) in distilled water containing 2- mercaptobenzothiazole 2.53 kg m$^{-3}$; magnesium chloride 9.5 kg m$^{-3}$; sodium hydroxide to pH 10.0 (25° C.). Potassium formate was added to samples of this solution in the following amounts: 100, 200 kg m$^{-3}$ final solution. Comparative D contains no potassium formate. Solutions were sealed in glass bottles inside gas-tight pressure pots and hot-rolled in an oven for 16 hours at 85° C. Viscosities before and after rolling were determined at 30° C. and 10 s$^{-1}$ shear rate as in Examples 1 to 4. Results were shown in Table 5.

TABLE 5

| Example Number | Concentration of potassium formate (kg m$^{-3}$) | % of initial viscosity retained |
|---|---|---|
| 13 | 100. | 48 |
| 14 | 200. | 48 |
| Comparative D | 0. | 0 |

EXAMPLE 15 AND 16

Solutions in distilled water were prepared comprising the following: "SHELLFLO-XA" (trade mark) biopolymer (2.53 kg m$^{-3}$ active polymer); magnesium chloride 9.5 kg m$^{-3}$; sodium hydroxide to pH 10.0 (25° C.). Potassium formate was added to samples of this solution in the following amounts: 400 and 600 kg m$^{-3}$ final solution. Comparative solutions E and F were prepared with the same composition except that potassium formate as replaced by potassium acetate. The solutions were then sealed in glass bottles inside gas-tight pressure pots and hot-rolled in an oven for 16 hours at 165° C. Viscosities before and after rolling were determined at 30° C. and 10 s$^{-1}$ shear rate as in Examples 1 to 4. Results are shown in Table 6.

TABLE 6

| Example Number | Concentration of potassium formate (kg m$^{-3}$) | % of initial viscosity retained |
|---|---|---|
| 15 | 400. | 79 |
| Comparative E | 400. | 13 |
| 16 | 600. | 93 |
| Comparative F | 600. | 20 |

We claim:

1. An aqueous polysaccharide composition comprising 0.03 to 5% w/v of a water-soluble microbial polysaccharide selected from Succinoglycan or Xanthan polysaccharides, 5 to 120% w/v of at least one sodium or potassium salt, wherein at least 0.05% w/v, based on the composition, of said sodium or potassium salt is formate, the balance of said sodium or potassium salt, if any, being at least one halide.

2. A composition according to claim 1 wherein the halide is selected from chloride and bromide.

3. A composition according to any one of claims 1 or 2 wherein the water-soluble polysaccharide is a Xanthan polysaccharide.

4. A composition according to any one of claims 1 or 2 wherein the water-soluble polysaccharide is present in an amount from 0.1 to 2% w/v.

5. A composition according to any one of claims 1 or 2 wherein the water-soluble polysaccharide is present in an amount from 0.25 to 0.75% w/v.

6. A composition according to any one of claims 1 or 2 wherein said sodium or potassium salt is present in an amount of at least 9% w/v and the formate is present in an amount of at least 2% w/v.

7. A composition according to any one of claims 1 or 2 wherein the formate is present in an amount of at least 10% w/v.

8. A process for preparing a composition according to any one of claims 1 or 2, which comprises dissolving at least 0.05% w/v of the formate salt in an aqueous composition containing the water-soluble polysaccharide, with, when present, the halide.

9. A process according to claim 8 wherein a Xanthan polysaccharide is used.

10. A process according to claim 9 wherein at least one salt is added in an amount of at least 9% w/v, and the formate is added in an amount of at least 2% w/v.

11. A process according to claim 10 wherein the formate is added in an amount of at least 10% w/v.

* * * * *